United States Patent
Kim et al.

(10) Patent No.: US 7,167,617 B2
(45) Date of Patent: Jan. 23, 2007

(54) OPTICAL COUPLING DEVICE AND METHOD FOR FABRICATING THE SAME, AND MASTER USED IN FABRICATING OPTICAL COUPLING DEVICE AND METHOD FOR FABRICATING THE SAME

(75) Inventors: Jin Tae Kim, Daejeon-Si (KR); Byeong Cheol Kim, Daejeon-Si (KR); Myung Yung Jeong, Daejeon-Si (KR)

(73) Assignee: Electronics and Telecommunications Research Institute, Daejeon-Si (KR)

( * ) Notice: Subject to any disclaimer, the term of this patent is extended or adjusted under 35 U.S.C. 154(b) by 0 days.

(21) Appl. No.: 10/984,796

(22) Filed: Nov. 10, 2004

(65) Prior Publication Data
US 2005/0185891 A1    Aug. 25, 2005

Related U.S. Application Data

(62) Division of application No. 10/329,375, filed on Dec. 27, 2002.

(30) Foreign Application Priority Data

Oct. 24, 2002   (KR) ............................... 2002-65121

(51) Int. Cl.
*G02B 6/30*   (2006.01)
(52) U.S. Cl. ............................ 385/49; 385/52; 385/147
(58) Field of Classification Search ................. 385/14, 385/49–52, 88, 89, 134, 147
See application file for complete search history.

(56) References Cited

U.S. PATENT DOCUMENTS 4,124,473 A * 11/1978 Lehmann et al. ...... 204/192.32

(Continued)

FOREIGN PATENT DOCUMENTS

JP        07-218739        8/1995

(Continued)

OTHER PUBLICATIONS

Hans-Dieter Bauer, et al.; Polymer waveguide devices with passive pigtailing: an application of LIGA technology; Synthetic Metals 115 (2000) ; pp. 13-20.

(Continued)

*Primary Examiner*—Akm Enayet Ullah
*Assistant Examiner*—Kevin S. Wood
(74) *Attorney, Agent, or Firm*—Mayer, Brown, Rowe & Maw LLP (57) ABSTRACT

An integrated type optical coupling device capable of easily accurately performing an optical arrangement between a narrow-pitch multi-channel optical waveguide and an optical fiber array and a master used in fabricating the same are provided. By forming a fixing projection between the optical fibers, the dynamic stability of the optical fiber array is increased and the optical arrangement between the optical waveguide and the optical fiber is easily accurately performed by hand. Accordingly, the cost required for the alignment is reduced and the alignment error due to the rolling of the optical fiber is not generated. In addition, the multi-step metal master is fabricated by using a photoresist film for X-ray exposure, and the narrow-pitch multi-channel optical coupling device is fabricated in a hot embossing method using the same, thereby the high-integrated device can be fabricated at a low price.

5 Claims, 13 Drawing Sheets

U.S. PATENT DOCUMENTS

| | | | |
|---|---|---|---|
| 5,234,571 A | 8/1993 | Noeker | |
| 5,260,175 A * | 11/1993 | Kowanz et al. | 430/326 |
| 5,311,604 A | 5/1994 | Rogner et al. | |
| 5,359,687 A | 10/1994 | McFarland et al. | |
| 5,501,784 A * | 3/1996 | Lessmollmann et al. | 205/67 |
| 5,529,681 A * | 6/1996 | Reinecke et al. | 205/70 |
| 5,535,295 A | 7/1996 | Matsumoto | |
| 5,594,824 A | 1/1997 | Kerndlmaier | |
| 5,600,745 A | 2/1997 | Wuu et al. | |
| 5,645,977 A * | 7/1997 | Wu et al. | 430/320 |
| 5,716,741 A | 2/1998 | Reinecke et al. | |
| 5,737,138 A | 4/1998 | Someno | |
| 6,160,936 A | 12/2000 | You et al. | |
| 6,517,995 B1 * | 2/2003 | Jacobson et al. | 430/320 |
| 2003/0021550 A1 * | 1/2003 | Korenaga et al. | 385/88 |
| 2003/0062638 A1 * | 4/2003 | Dhar | 264/1.31 |
| 2004/0013982 A1 * | 1/2004 | Jacobson et al. | 430/320 |
| 2004/0042753 A1 * | 3/2004 | Steenblik et al. | 385/131 |
| 2005/0008317 A1 * | 1/2005 | Kuramoto et al. | 385/129 |

FOREIGN PATENT DOCUMENTS

JP          2001-281479          10/2001

OTHER PUBLICATIONS

Edmond J. Murphy; Fiber Attachment for Guided Wave Devices; Journal of Lightwave Technology; vol. 6, No. 6; Jun. 1988; pp. 862-871.

R. Müller-Fiedler, et al.; Assembly and interconnection technologies for electrical and optical microsystems; SPIE; vol. 2783; pp. 88-97.

* cited by examiner

OPTICAL COUPLING DEVICE AND METHOD FOR FABRICATING THE SAME, AND MASTER USED IN FABRICATING OPTICAL COUPLING DEVICE AND METHOD FOR FABRICATING THE SAME

This application is a divisional application of Ser. No. 10/329,375, filed Dec. 27, 2002.

BACKGROUND OF THE INVENTION

1. Field of the Invention

The present invention relates to an optical coupling device and a master used in fabricating the optical coupling device, more particular, to an integrated type optical coupling device and a master used in fabricating the optical coupling device that an optical alignment between a narrow-pitch multi-channel optical waveguide and an optical fiber array can be easily accurately performed and the fabricating cost thereof can be reduced.

2. Description of the Prior Art

Recently, as an information communication industry is developed, data transmission using a communication network such as Internet is actively increased, thereby large scale, high speed, and high density of a transmission/exchange system for increasing the transmitting amount and the transmitting speed of data has been demanded. According to the demand, the research for integrating the channel to 40 channels greater than the existing 8 or 16 channels in a same area has been progressed. At this case, since the pitch between the channels is reduced from 250 μm to 125 μm, it is difficult to fabricate the system. Accordingly, the implement of the optical device which can easily integrate the channel, can increase optical coupling efficiency with the optical fiber, and can reduce the fabricating cost thereof is needed.

Generally, the optical coupling device for optically coupling with the optical fiber and electrically or optically controlling an optical signal comprises modules formed with a plurality of V-shaped grooves for mounting an optical fiber array, a waveguide element coupled between the modules and formed with a multi-channel optical waveguide, and a controlling means for electrically or optically controlling the optical signal transmitted through the optical waveguide.

In the conventional optical coupling device having the above-mentioned structure, the module and the waveguide element are separately fabricated and are coupled with each other. Accordingly, first, optical coupling loss can be generated due to the variation if a thermal or mechanical impact is applied thereto. Second, since the dynamic stability of the optical fiber is not secured due to the space of the lower portion when the optical fiber is aligned in the V-shaped groove, the length of the V-shaped groove must be relatively long, thereby it is difficult to reduce the size of the structure. Also, third, an expensive optical fiber aligning device must be used in order to make a precise optical alignment between the optical waveguide and the optical fiber array. Fourth, since the optical fiber is fixed by an adhesive to make the active optical alignment with the waveguide element after the intensity of the transmitted light is checked by the channel, the time and technical cost required for aligning the optical fiber array is proportionally increased as the number of the channels is increased.

On the other hand, a master (a metallic pattern) is used in manufacturing the module mounted with the optical fiber and the waveguide element. The multi-step master is fabricated by a patterning process using several masks each having a different exposed location. Accordingly, there is a merit that multi-step structure having a different height proportional to the exposed number is made, but the masks as same number as the exposed number must be fabricated, an accurate location alignment of the mask is need in each of the exposing steps, and it is difficult to accurately adjust the time for exposing the photoresist film and the height of the fine structure.

As an alternative method, a method for fabricating a master, applying the photoresist film thereon, and performing the plating to implement a fine structure having various heights on the same surface is suggested. In this method, since the photoresist film is formed on the master and then is exposed by using the mask, a precise mask aligning technique is needed, the mask fabricating processes as same number as the number of the steps of the mask must be repeatedly performed. Above all, since a precise dimension control determines the precision of the master which is finally fabricated in the master fabricating process, a precise machining technique is needed. In addition, there is a problem that the fine structure fabricated previously is damaged when forming the photoresist on the fabricated master.

SUMMARY OF THE INVENTION

Thus, the object of the present invention is to fabricate a multi-step metal master capable of increasing a dynamic stability of an optical fiber array by using a photoresist film for X-rays exposure and performing a precise optical alignment between a waveguide and a optical fiber, and provide an optical coupling device capable of solving the above-mentioned problem by fabricating a narrow-pitch multi-channel optical device by a hot embossing process using the master and a master used in fabricating the same.

The optical coupling device according to the present invention for accomplishing the above-mentioned object comprises a substrate; and a clad formed on the substrate and having a convex portion protruded at the middle portion thereof and concave portions located at both sides of the convex portion, wherein the convex portion having a plurality of waveguides formed thereon in a longitudinal direction and wherein the concave portion having a plurality of optical fiber fixing grooves separated from each other by fixing projections so that each of the optical fiber fixing grooves is matched with each of waveguides.

The optical coupling device further comprises electrodes located on the waveguides for controlling optical signals transmitted through the waveguides, and the clad is composed of polymer.

The height h of the fixing projection is obtained by the next equation 1:

$$h \geq R\left(1 - \frac{1}{\sqrt{\left(\frac{F}{W}\right)^2 + 1}}\right) \quad (1)$$

Here, R is the radius of the optical fiber, F is the force applied to the optical fiber from the outside, and W is the weight of the optical fiber.

The method for fabricating an optical coupling device according to present invention for accomplishing the above-mentioned object comprises the steps of forming a lower clad layer on a substrate; positioning a metal master on the lower clad layer and applying a heat thereto; pressing the master to the lower clad layer to mold a lower clad having a convex portion protruded at the middle portion thereof and concave portions located at both sides of the convex portion, wherein the convex portion has a plurality of waveguides formed thereon in a longitudinal direction and wherein the concave portion has a plurality of optical fiber fixing grooves separated from each other by fixing projections so that each of the optical fiber fixing grooves is matched with each of waveguides; forming a core in the waveguide formed in the convex portion of the lower clad; forming an upper clad on the core; and forming electrodes on the upper clad.

The heat is at least a transition temperature of glass, and, when the lower clad is molded, a hot embossing device is used.

The core is formed by the steps of applying polymer on the lower clad; positioning a mask formed with a pattern on the lower clad so that only the waveguide is exposed to ultraviolet rays and irradiating the ultraviolet rays to harden the polymer of the exposed portion; and removing the unhardened polymer to leave the polymer for the core in the waveguide.

The master used in fabricating the optical coupling device according to the present invention for accomplishing the above-mentioned object has rectangular-shaped protrusions for forming the optical fiber fixing groove formed on both sides of a flat plate, a plurality of grooves for forming the optical fiber fixing projection formed on the rectangular-shaped protrusions, and a plurality of lines forming the waveguide formed between the rectangular-shaped protrusions on the flat plate.

The method for fabricating a master used in fabricating the optical coupling device according to the present invention for accomplishing the above-mentioned object comprises the steps of fabricating a structure having a convex portion protruded at the middle portion thereof by etching both sides of a substrate by a predetermined depth and concave portions at both sides of the convex portion; applying a photoresist film on the structure and removing the photoresist film by a predetermined thickness so as to form a step in the surface thereof; exposing and developing the photoresist film so that a photoresist film pattern for forming the waveguide is formed in the convex portion of the substrate and a phtoresist film pattern for forming the optical fiber fixing projection is formed in the concave portion of the substrate; filling polymer in grooves between the photoresist film patterns for forming the waveguide; immersing the substrate in a plating bath to plate the concave portion with a metal, until the surface of the photoresist film pattern of the convex portion; removing the polymer filled in the groove between the photoresist film pattern for forming the waveguide; immersing the substrate in the plating bath again to plate the photoresist film pattern of the convex portion and the plated metal on the concave portion with a metal by a predetermined thickness; and removing the substrate.

The method for fabricating a master further comprises the step of applying a metal for the plating and an adhesive to the structure after the step of fabricating the structure, and the photoresist film is the photoresist film for X-ray exposure, and the photoresist film is removed by a predetermined thickness in a laser ablation method.

DESCRIPTION OF THE PREPERRED EMBODIMENT

The present invention provides an optical coupling device based on a narrow-pitch multi-channel optical fiber array and a master used in fabricating the same. The optical coupling device is designed so that the dynamic stability of the optical fiber array is increased to improve the optical coupling efficiency with the optical waveguide and the multi-step master is designed to be easily and precisely fabricated. The present invention can efficiently reduce the fabricating cost by fabricating the optical coupling device by the hot embossing process using the multi-step master.

In the present invention, in order to secure the dynamic stability of the optical fiber array, a fixing projection is formed in the optical fiber aligning portion to prevent the rolling of the optical fiber. Accordingly, the optical alignment between the optical waveguide and the optical fiber can be manually performed, thereby the cost required for the alignment is reduced and the alignment error due to the rolling of the optical fiber is not generated.

Hereinafter, the embodiments of the present invention will be explained with reference to the accompanying drawings. However, the embodiment of the present invention can be changed into a various type, and it should be not understood that the scope of the present invention is limit to the following embodiments. The embodiments of the present invention are provided in order to explain the present invention to those skilled in the art. In drawings, the size and the thickness of the film or the region are shown in an exaggerated shape or a different shape, for clearness.

Figure 1:
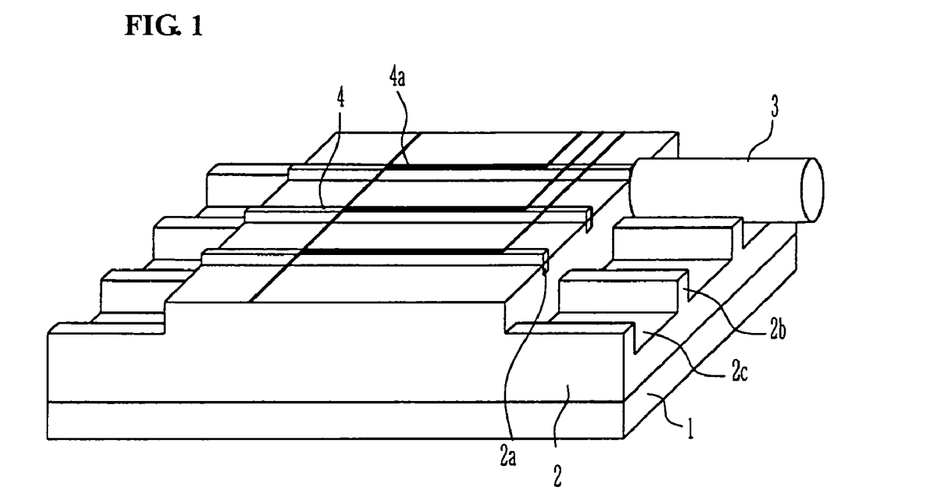
FIG. 1 is a perspective view of an optical coupling device according to the present invention.

FIG. 1 shows all the structure of the optical coupling device according to an embodiment of the present invention.

On a substrate 1, a clad 2 consisting of polymer layer and having a convex portion at a middle portion thereof is formed. A plurality of waveguides 2a are formed in the convex portion of the clad 2 in a longitudinal direction. A plurality of optical fiber fixing grooves 2c separated from each other by fixing projections 2b are formed in the concave portion so that each of the optical fiber fixing grooves 2c is matched with each of the waveguides 2a. A clad 4 are formed on the waveguide 2a and electrodes 4a are formed on the clad 4.

An optical fiber 3 is inserted into each of the optical fiber fixing grooves 2c to be matched with the waveguide 2a. When an optical signal is transmitted from the core of the optical fiber 3 to the core of the opposite optical fiber 3 through the waveguide 2a, an electrical signal is applied to the electrode 4a formed on the clad 4 to electrically control the progressed optical signal. This structure is, for example, adapted to the optical device such as an optical attenuator.

Figure 2:
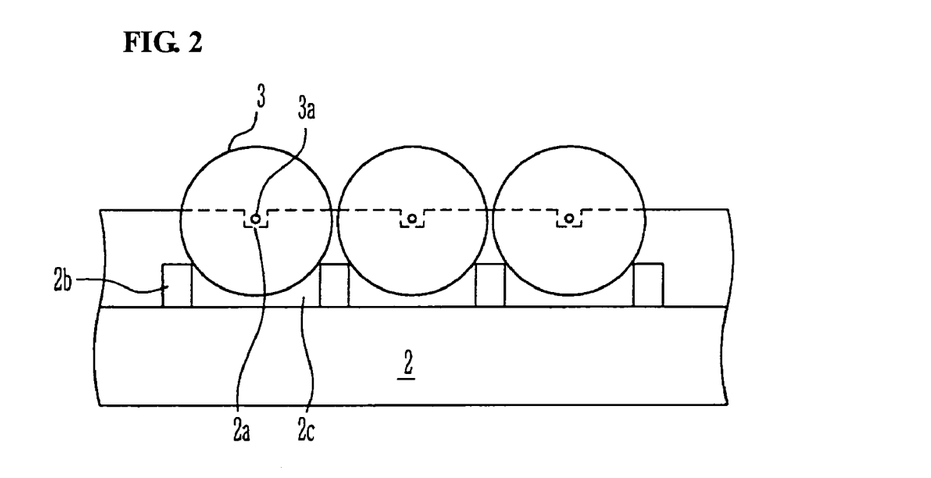
FIG. 2 is a side view of FIG. 1.

FIG. 2 is a side view of FIG. 1. In order to increase the channel number to at least 40 while maintaining the same dimension as the prior art, the pitch between the optical fibers 3 must be decreased from 250 μm to 125 μm. Considering the error of the diameter of the optical fiber, it is preferable that the pitch must be 127 μm. The horizontal and vertical length of the waveguide forming a single mode 2a are 7.0 μm or less for, and the diameter of the core 3a of the optical fiber for the single mode become 9.0 μm or less.

The optical coupling efficiency in the single mode is at a maximum when the core 3a of the optical fiber is located in the center of the optical waveguide 2a. For this, the depth of the fixing groove 2c is adjusted to 66 μm so that the core 3a of the optical fiber is located in the center of the waveguide 2a. Also, in order to prevent horizontally moving the core 3a of the optical fiber due to the rolling of the optical fiber 3, rectangular fixing projections 2b are respectively formed between the optical fiber fixing grooves 2c.

Figure 3:
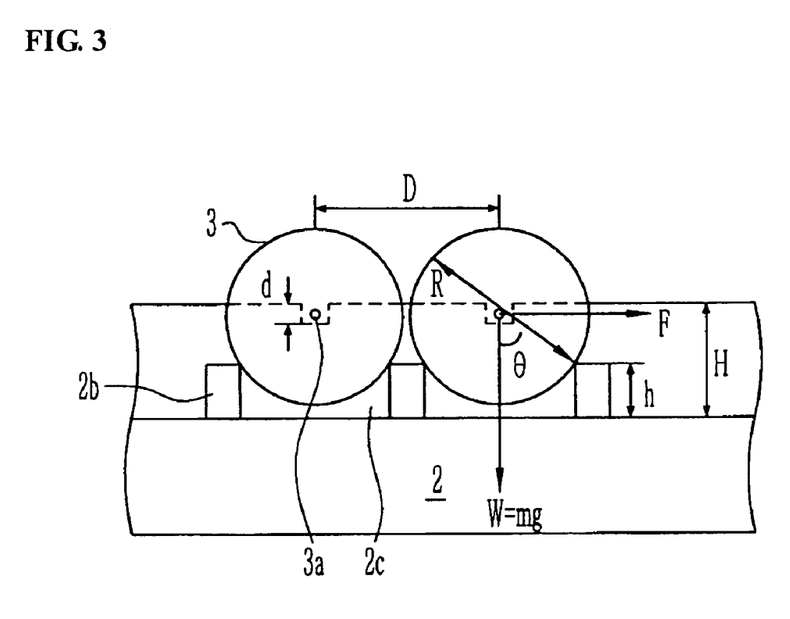
FIG. 3 is a cross-sectional view illustrating the structural characteristics of the optical coupling device according to the present invention.

FIG. 3 is a detail illustrating the dynamic relationship between the fixing projection 2b and the optical fiber 3, wherein H is the height of the convex portion formed with the waveguide 2a, d is the width and the depth of the waveguide 2a, and D is the distance (pitch) between the waveguides 2a. The height h of the fixing projection 2b for preventing the alignment error between the waveguide 2a and the optical fiber 3 generated due to the rolling of the optical fiber 3 when tilting all the structure is expressed by the next equation 2.

$$h \geq R \left( 1 - \frac{1}{\sqrt{\left(\frac{F}{W}\right)^2 + 1}} \right) \quad (2)$$

Here, R is the radius of the optical fiber 3, F is the force applied to the optical fiber 3 from the outside, and W is the weight of the optical fiber 3.

For example, supposing that the minimum force F for rolling the optical fiber 3 is equal to the weight W of the optical fiber 3 and the radius R of the optical fiber 3 is 62.5 μm, the height h of the fixing projection 2b becomes about 18.3 μm.

Figure 4A:
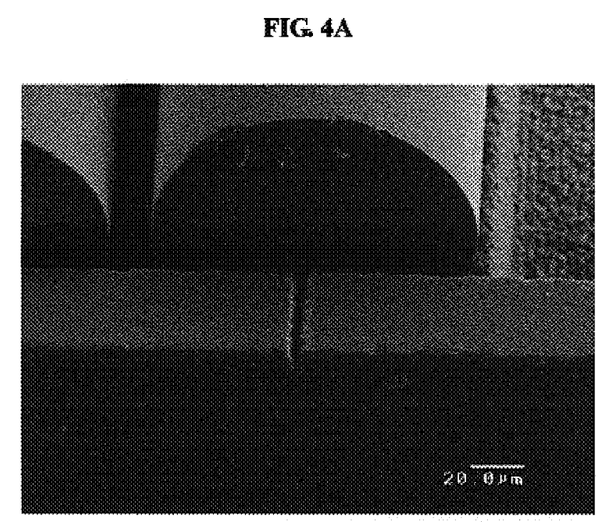
FIGS. 4a and 4b are partially detail views showing an optically aligned example by using the optical coupling device according to the present invention.
Figure 4B:
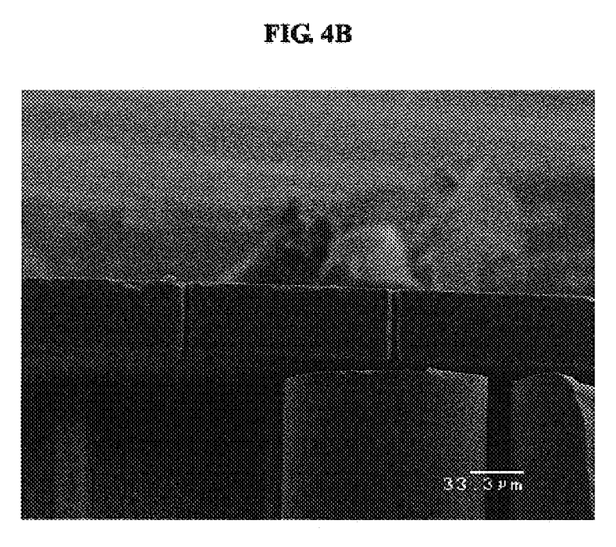

FIGS. 4a and 4b illustrate the example of realizing the optical alignment between the waveguide 2a and the optical fiber 3 by using the optical coupling device according to the present invention, wherein the center of the core 3a of the optical fiber is accurately matched with the waveguide 2a, and the optical fiber 3 is fixed by the fixing projection 2b.

Next, the method for fabricating the optical coupling device according to the present invention will be explained with reference to FIGS. 5a to 5i. In this embodiment, for example, the optical attenuator fabricating procedures will be described.

Figure 5A:
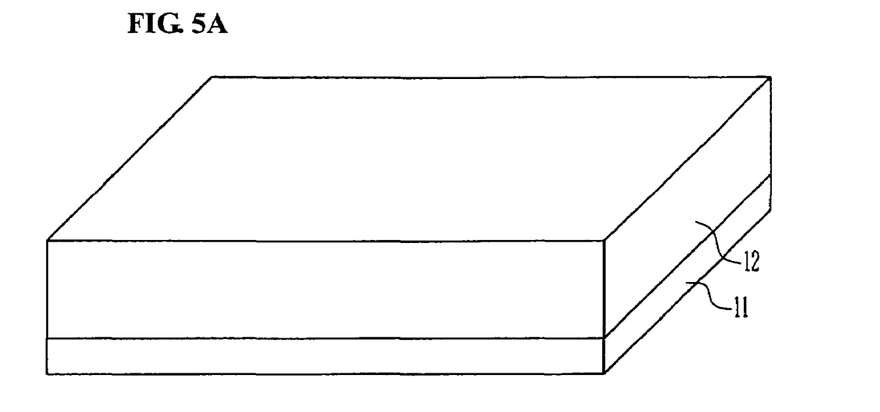
FIGS. 5a to 5i are views illustrating a method used in fabricating the optical coupling device according to the present invention.

Referring to FIG. 5a, a lower clad layer 12 consisting of the polymer is formed on a substrate 11.

Figure 5B:
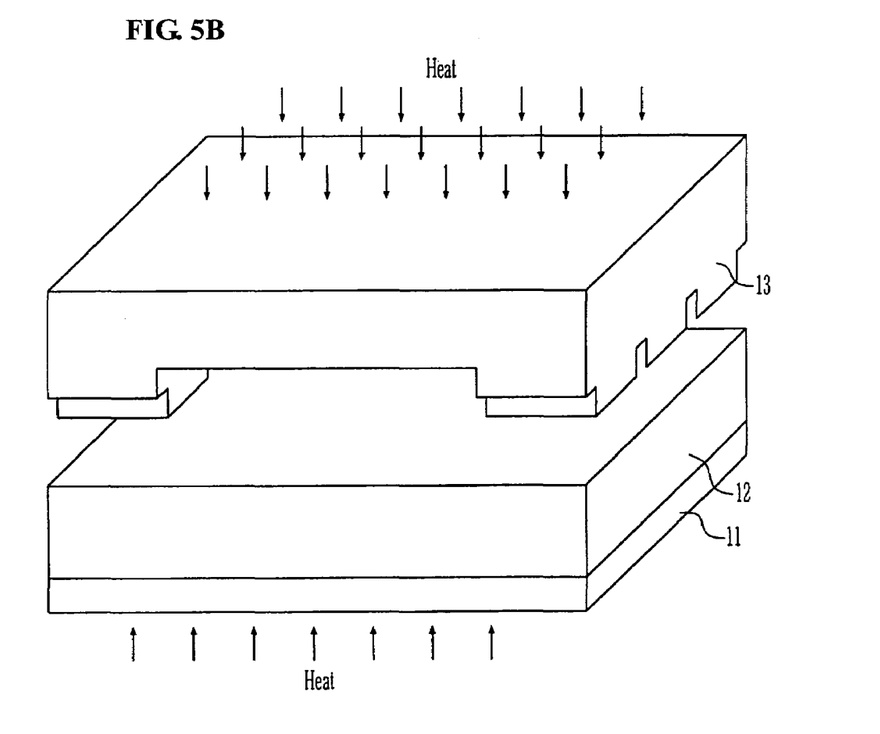

Referring to FIG. 5b, the substrate 11 formed with the lower clad layer 12 is positioned in the lower end of a hot embossing device and a multi-step master 13 fabricated according to the present invention is positioned in the upper end of the hot embossing device. And then, the heating treatment is performed at a transition temperature of a glass, for example, a temperature of 130° C. to 200° C. The multi-step master 13 will be explained later.

Figure 5C:
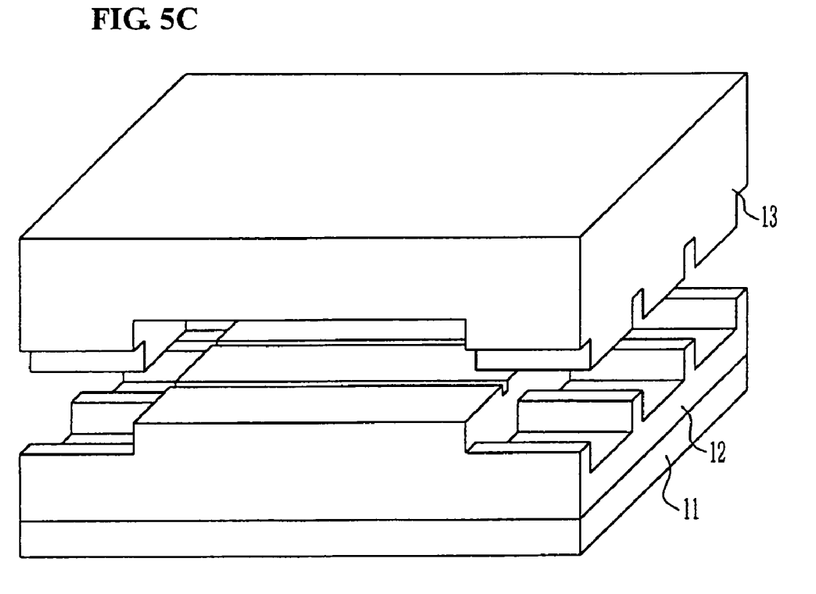

Referring to FIG. 5c, while maintaining the temperature, the master 13 is pressed to the lower clad layer 12 in an appropriate pressure and then is separated therefrom.

Figure 5D:
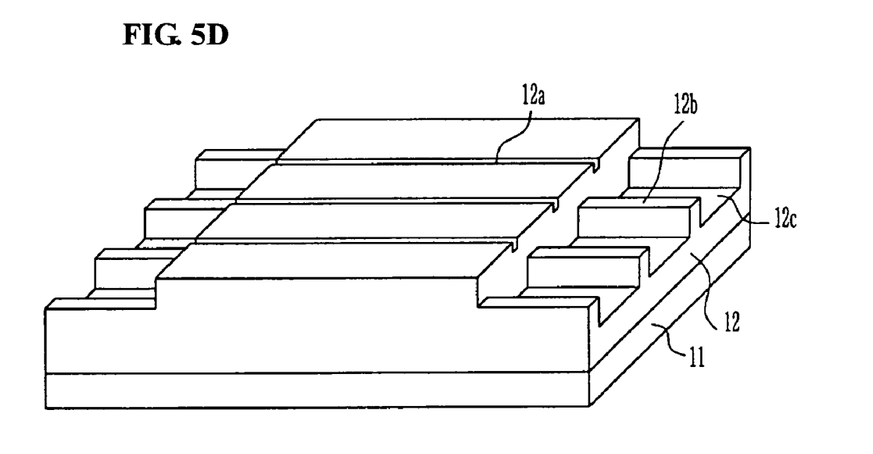

Referring to FIG. 5d, when the master 13 is removed, the molding of the lower clad layer 12 is finished. The lower clad layer 12 is composed of a convex portion at the middle portion thereof and concave portions at both sides of the convex portion. A plurality of the waveguides 12a are formed in the surface of the convex portion in the longitudinal direction, and a plurality of optical fiber fixing grooves 12c separated from each other by fixing projections 12b are formed in the concave portion so that each of the optical fiber fixing grooves 12c is matched with each of the waveguides 12a.

Figure 5E:
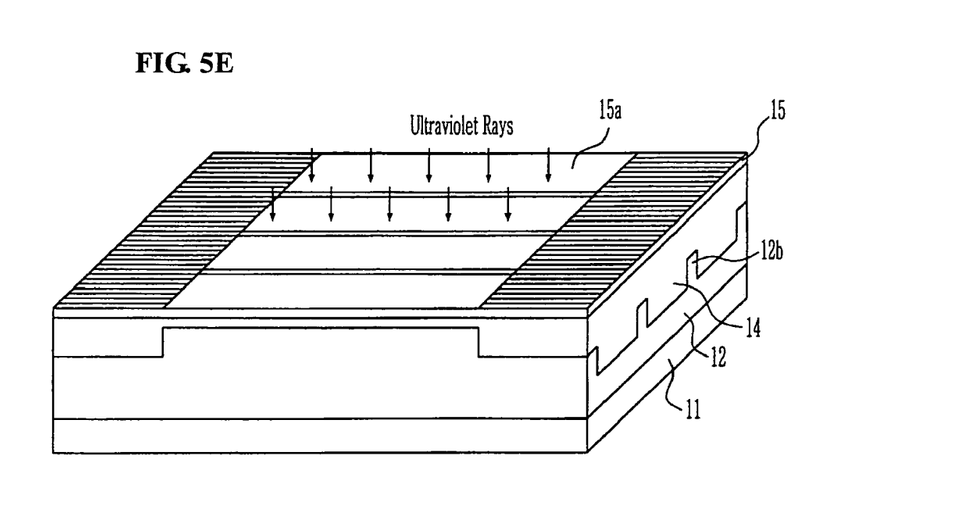

Referring to FIG. 5e, polymer 14 is applied to the lower clad layer 12 molded in FIG. 5d. At this time, the material capable of being hardened by ultraviolet rays is used as the polymer 14. The mask 15 formed with a pattern 15a is positioned on the lower clad layer 12 so that only the waveguide 12a is exposed to the ultraviolet rays and the ultraviolet ray are irradiated to harden the polymer 14 of the exposed portion. At this time, in order to prevent a slap generated in the core of the waveguide 12a from being formed, the mask 15 is pressed to the lower clad layer 12 and the mask 15 having the material that is not adhered to the hardened polymer 14 is used or the surface of the mask 15 is chemically treated.

Figure 5F:
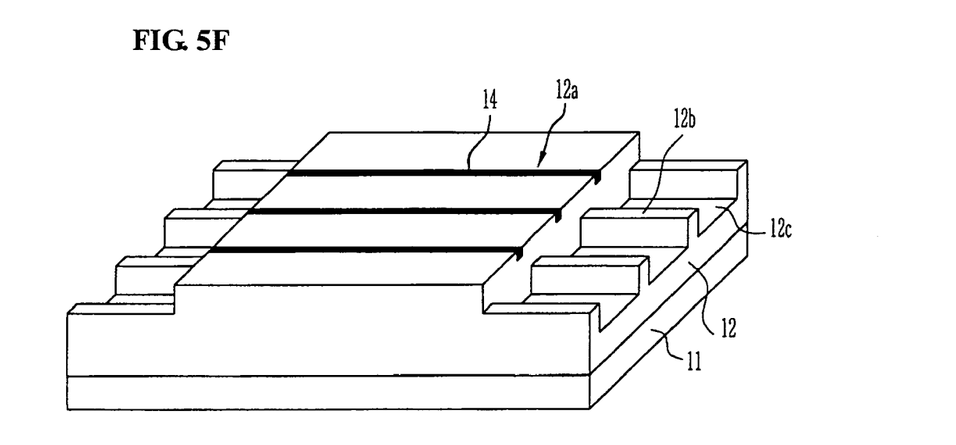

Referring to FIG. 5f, after the mask 15 is removed, the unhardened polymer 14 is cleaned to be removed, thereby the polymer 14 for the core is embedded in only the waveguide 12a.

Figure 5G:
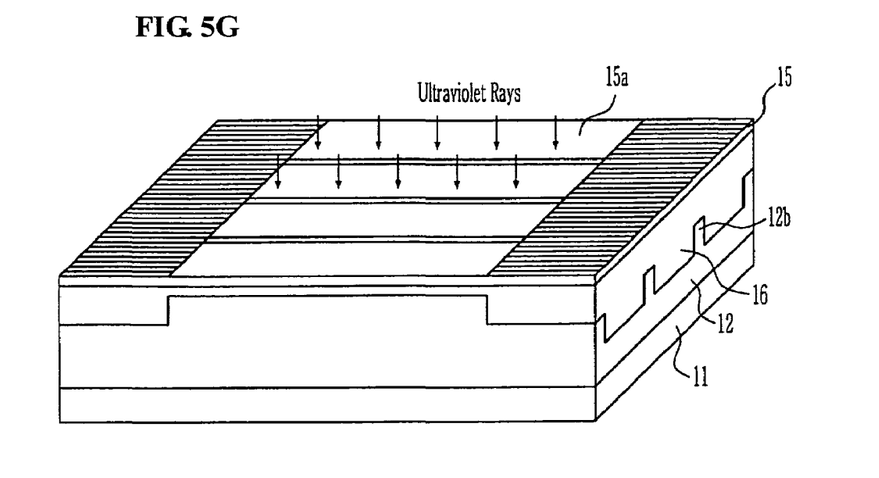

Referring to FIG. 5g, after polymer 16 to be used as an upper clad is applied to all the structure, the mask 15 is positioned thereto, and then the ultraviolet rays are irradiated to harden the polymer 16.

Figure 5H:
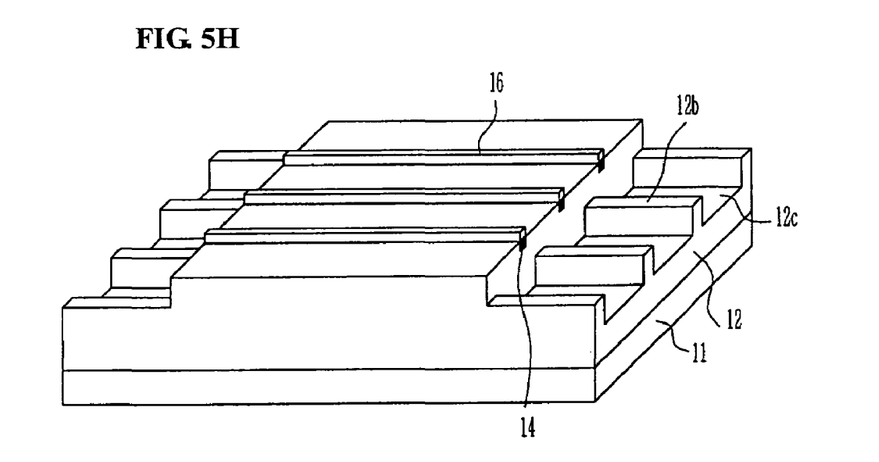

Referring to FIG. 5h, after the mask 15 is removed, the unhardened polymer 16 is removed, and then an upper clad layer 16 is formed on the polymer 14 for the core. At this time, the upper clad layer 16 can be applied to both the polymer 14 for the core and the lower clad layer 12.

Figure 5I:
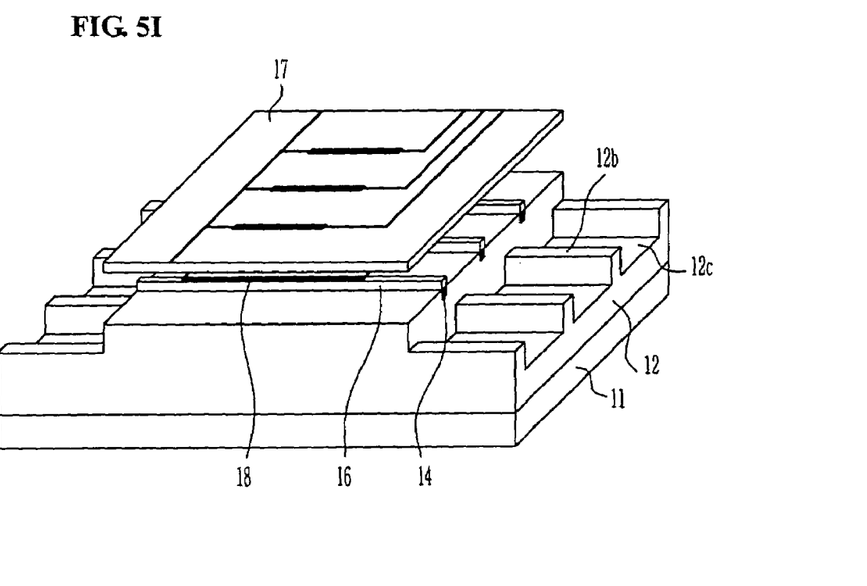

Referring to FIG. 5i, a mask 17 for forming the electrode is positioned on the upper clad layer 16 and a metal is deposited to form the electrode 18 of the optical attenuator.

Next, the optical fiber is inserted into the optical fiber fixing groove 12c, is aligned so that the core is matched with the core of the waveguide 12a, and is fixed by the polymer hardened by the ultraviolet rays and having a refractive index similar to that of the core of the optical fiber, thereby a optical attenuator or an optical device for optically aligned with the optical waveguide by hand is fabricated.

Figure 6:
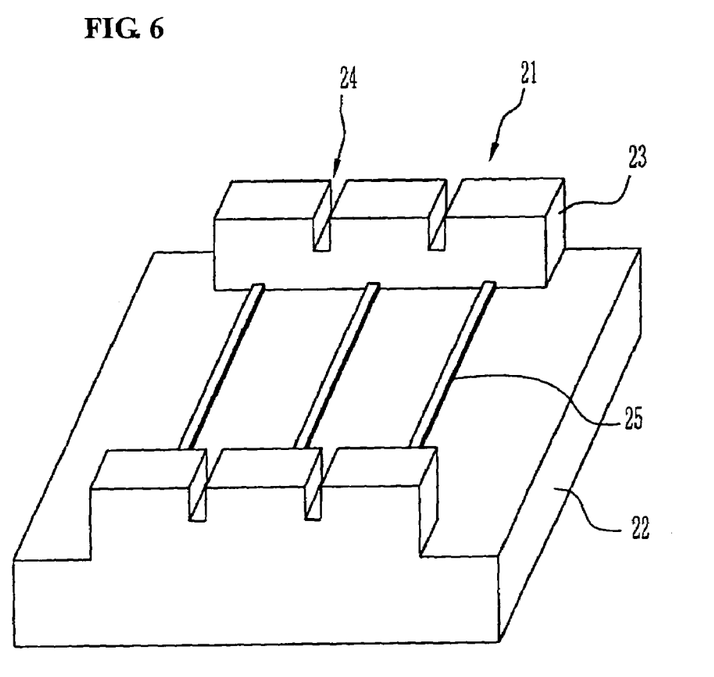
FIG. 6 is a perspective view of a master for fabricating the optical coupling device according to the present invention.

Next, the master according to the present invention used in molding the lower clad layer 12 will be described with reference to FIG. 6.

The metal master 21 according to the present invention comprises a flat portion 22, a rectangular-shaped protrusion 23 formed on both sides of the flat portion 22 for forming the optical fiber fixing groove, a plurality of rectangular-shaped grooves 24 for forming the optical fiber fixing projection, and lines 25 protruded in a longitudinal direction for forming the waveguide in the flat portion 22 between the protrusions 23.

FIGS. 7a to 7j are views illustrating a method for the master used in fabricating the optical coupling device according to the present invention.

Figure 7A:
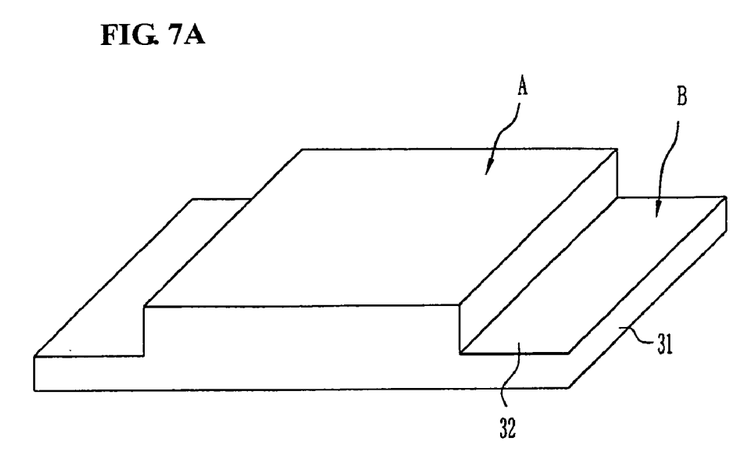
FIGS. 7a to 7j are views illustrating a method for the master used in fabricating the optical coupling device according to the present invention.

Referring to FIG. 7a, a structure composed of a convex portion A of middle portion protruded by etching both sides of the substrate 31 consisting of silicon Si by a predetermined depth and a concave portion B at both sides of the convex portion is fabricated. Next, an adhesive 32 for improving the adhesive strength of the photoresist film for X-ray exposure is applied to the substrate 31.

Figure 7B:
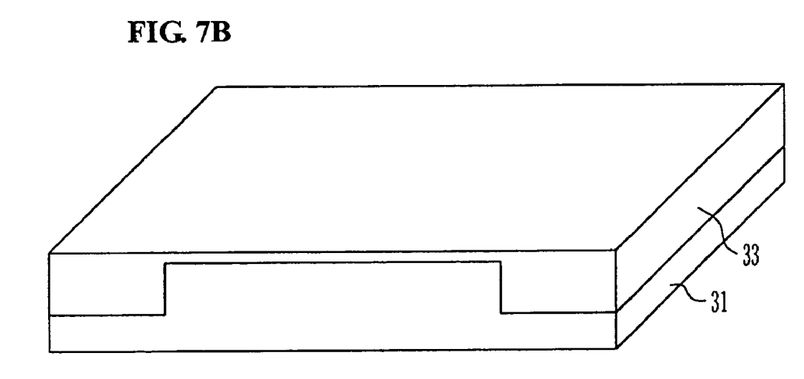

Referring to FIG. 7b, a photoresist film 33 for X-ray exposure is applied to the substrate 31 applied with the adhesive 32.

Figure 7C:
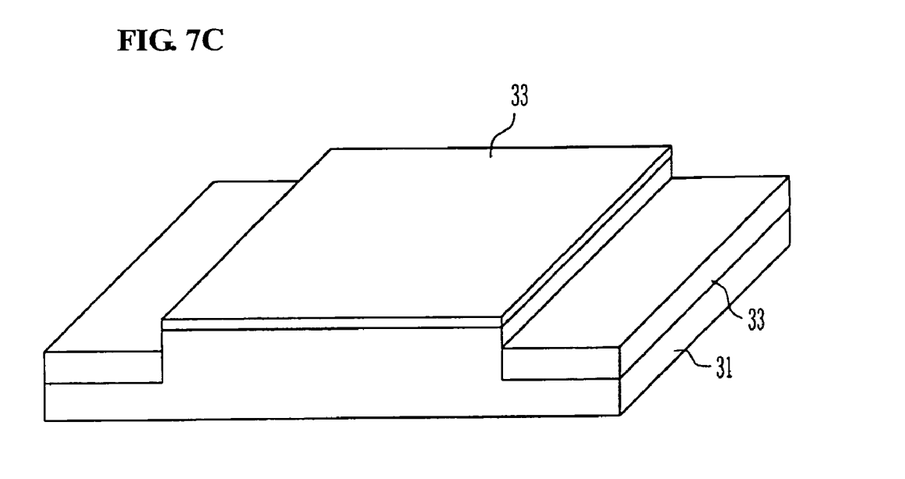

Referring to FIG. 7c, in order to easily fabricate the master and increase the geometrical precision thereof, the photoresist film 33 of the concave portion B is removed by a predetermined thickness in a laser ablation method. At this time, if necessary, the photoresist film 33 of the convex portion A can be removed by a predetermined thickness.

Figure 7D:
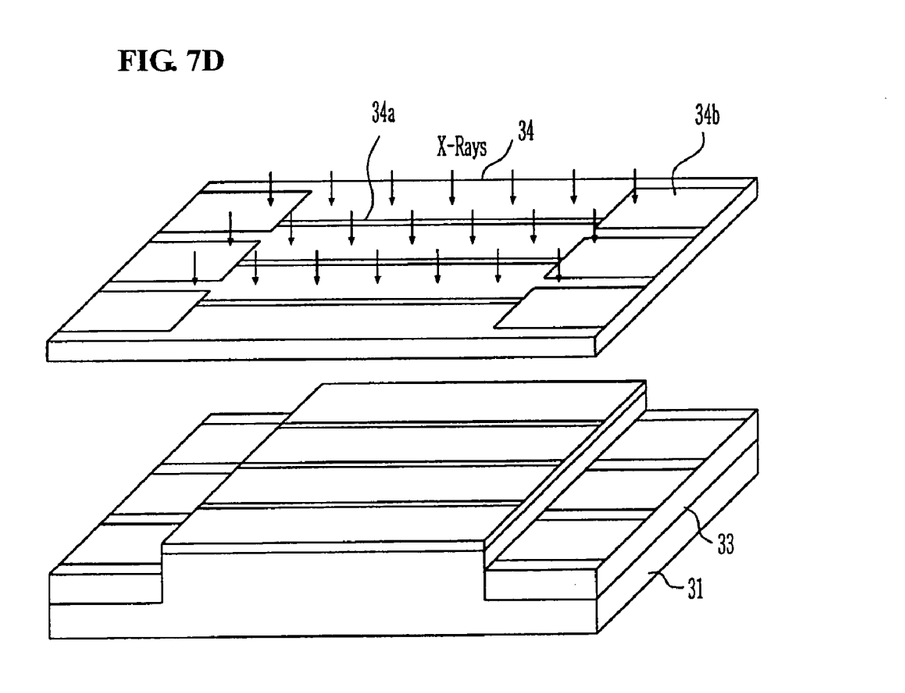

Referring to FIG. 7d, a X-ray mask 34 formed with a waveguide pattern 34a and an optical fiber fixing groove pattern 34b is positioned on the photoresist film 33 and the structure is exposed by X-rays irradiated from a synchrotron.

Figure 7E:
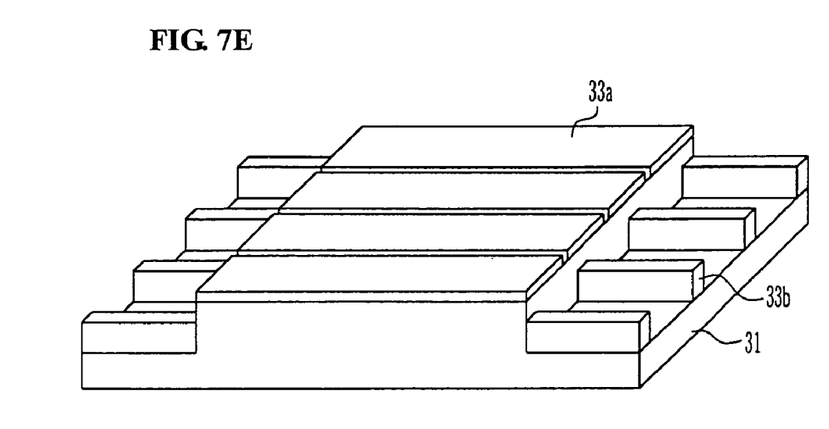

Referring to FIG. 7e, after the mask 34 is removed, the photoresist film 33 is developed, thereby the photoresist film pattern 33a for forming the waveguide 12a is formed in the convex portion, and the photoresist film pattern 33b for forming the optical fiber fixing projection 12b is formed in the concave portion.

Figure 7F:
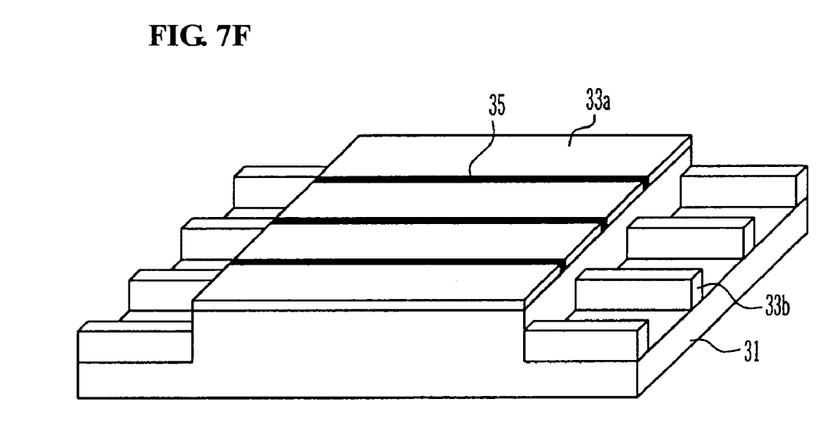

Referring to FIG. 7f, in order to prevent the difference between the plating speeds due to the difference between the heights of the structure and easily fabricate the master, polymer 35 is filled in the groove between the photoresist film patterns 33a for forming the waveguide 12a which is relatively located in a high place. At this time, instead of the polymer 35, the adhesive 32 can be used.

Figure 7G:
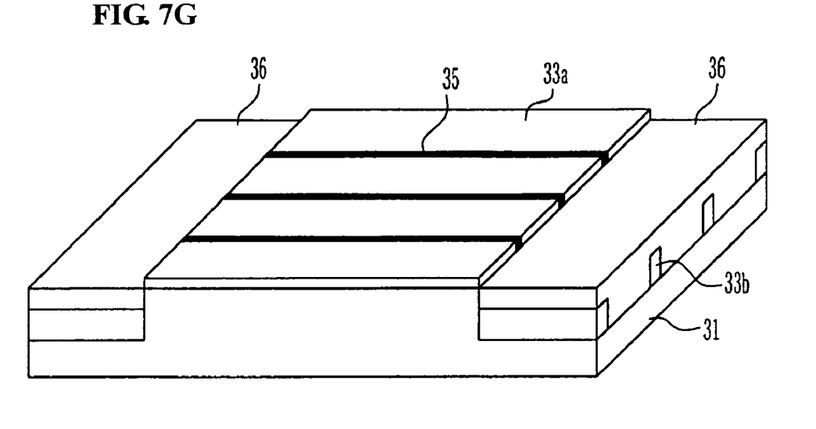

Referring to FIG. 7g, the substrate 31 is immersed in a plating bath to plate the concave portion with a metal until the surface of the photoresist pattern 33a of the convex portion. At this time, the thickness of the metal 36 plated on the concave portion become the height of the surface of the photoresist film pattern 33a.

Figure 7H:
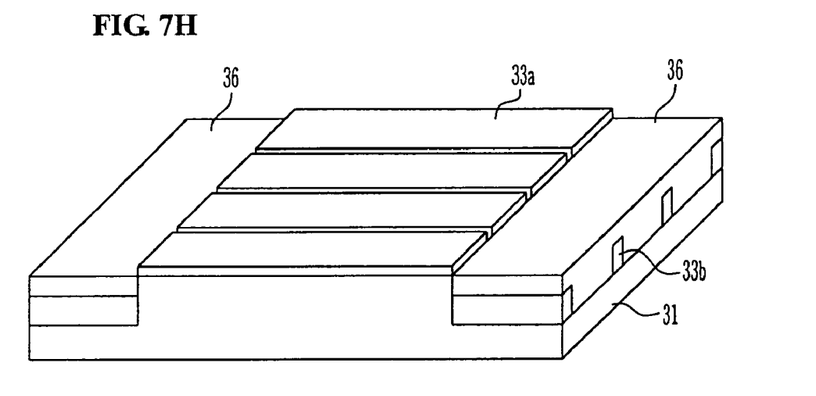

Referring to FIG. 7h, the polymer 35 filled in the groove between the photoresist film patterns 33a for the waveguide 12a is removed.

Figure 7I:
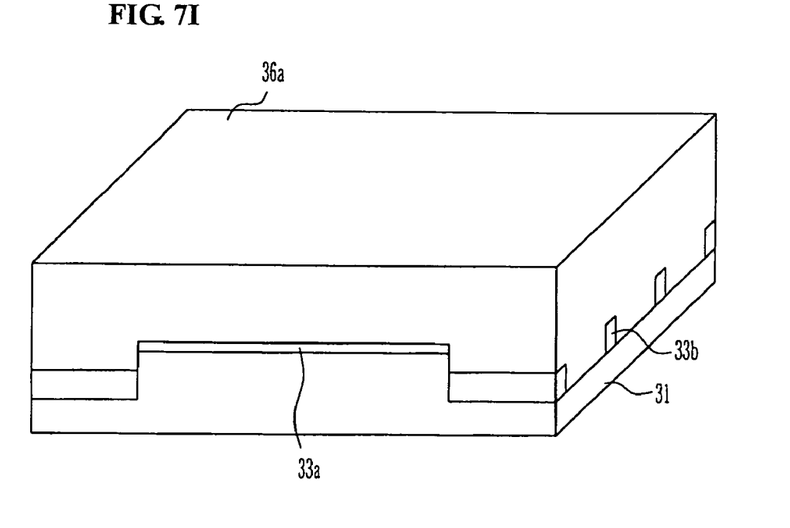

Referring to FIG. 7i, the substrate 31 is immersed in a plating bath again to plate the photoresist film pattern 33a of the convex portion and the plated metal 36 of the concave portion with a metal by a predetermined thickness, thereby the master 36a of the metal structure is fabricated.

Figure 7J:
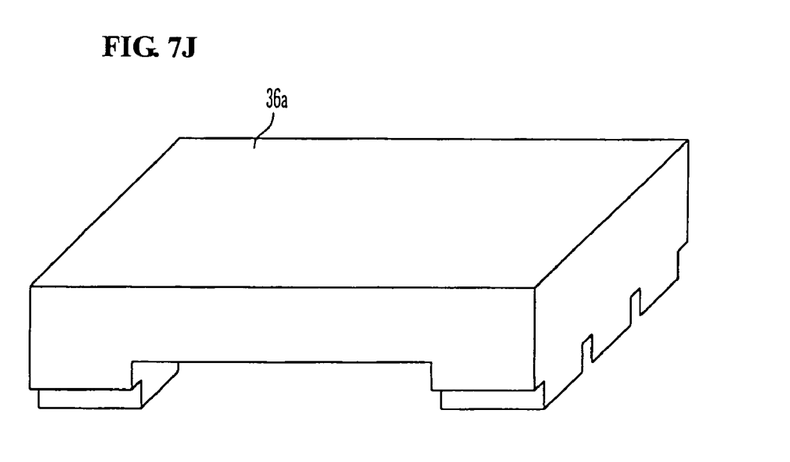

Referring to FIG. 7j, the master 36a is separated from the substrate 31.

As mentioned above, by forming the fixing projection between the optical fibers, the present invention can increase the dynamic stability of the optical fiber array and easily accurately perform the optical alignment between the optical waveguide and the optical fiber by hand. Accordingly, the cost and time required for the alignment is reduced and the alignment error due to the rolling of the optical fiber is not generated.

In addition, according to the present invention, the multi-step metal master is fabricated by using the photoresist film for X-ray exposure and the narrow-pitch multi-channel optical coupling device is fabricated in the hot embossing method using the same, thereby the high-integrated device can be fabricated at a low price.

Although the present invention has been illustrated and described with respect to exemplary embodiments thereof, the present invention should not be understood as limited to the specific embodiment, and it should be understood by those skilled in the art that the foregoing and various other changes, omission and additions may be made therein and thereto, without departing from the spirit and scope of the present invention.

What is claimed is:

1. A method for fabricating a master of an optical coupling device, comprising the steps of:
    fabricating a structure having a convex portion protruded at the middle portion thereof by etching both sides of a substrate by a predetermined depth and concave portions at both sides of said convex portion;
    applying a photoresist film on said structure and removing said photoresist film by a predetermined thickness so as to form a step in the surface thereof;
    exposing and developing said photoresist film so that a photoresist film pattern for forming the waveguide is formed in said convex portion of the substrate and a phtoresist film pattern for forming the optical fiber fixing projection is formed in the concave portion of the substrate;
    filling polymer in grooves between said photoresist film patterns for forming the waveguide;
    immersing said substrate in a plating bath to plate the concave portion with a metal, until the surface of the photoresist film pattern of said convex portion;
    removing the polymer filled in the grooves between said photoresist film patterns for forming the waveguide;
    immersing said substrate in the plating bath again to plate the photoresist film pattern of the convex portion and the plated metal on the concave portion with a metal by a predetermined thickness; and
    removing said substrate.

2. The method for fabricating a master according to claim 1, further comprising the step of applying a metal for the plating and an adhesive to said structure after said step of fabricating the structure.

3. The method for fabricating a master according to claim 1, said photoresist film is the photoresist film for X-ray exposure.

4. The method for fabricating a master according to claim 1, wherein said photoresist film is removed by a predetermined thickness in a laser ablation method.

5. The method for fabricating a master according to claim 1, the height of the photoresist film pattern for forming the optical fiber fixing projection is obtained the next equation 5:

$$h \geq R\left(1 - \frac{1}{\sqrt{\left(\frac{F}{W}\right)^2 + 1}}\right) \quad (5)$$

wherein R is the radius of said optical fiber, F is the force applied to said optical fiber from the outside, and W is the weight of said optical fiber.

* * * * *